United States Patent
Krijn et al.

(10) Patent No.: US 9,411,088 B2
(45) Date of Patent: Aug. 9, 2016

(54) ILLUMINATION MODULE

(75) Inventors: Marcellinus Petrus Carolus Michael Krijn, Eindhoven (NL); Michel Cornelis Josephus Marie Vissenberg, Eindhoven (NL); Willem Lubertus Ijzerman, Eindhoven (NL); Hugo Johan Cornelissen, Eindhoven (NL); Ramon Pascal Van Gorkom, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2202 days.

(21) Appl. No.: 12/064,636

(22) PCT Filed: Aug. 15, 2006

(86) PCT No.: PCT/IB2006/052808
§ 371 (c)(1),
(2), (4) Date: Feb. 25, 2008

(87) PCT Pub. No.: WO2007/023415
PCT Pub. Date: Mar. 1, 2007

(65) Prior Publication Data
US 2008/0186273 A1    Aug. 7, 2008

(30) Foreign Application Priority Data
Aug. 24, 2005    (EP) .................................... 05107749

(51) Int. Cl.
| | |
|---|---|
| *G02B 6/43* | (2006.01) |
| *G02F 1/13357* | (2006.01) |
| *F21V 8/00* | (2006.01) |
| *G02F 1/1335* | (2006.01) |

(52) U.S. Cl.
CPC ............ *G02B 6/0021* (2013.01); *G02B 6/0038* (2013.01); *G02F 1/133609* (2013.01); *G02B 6/0036* (2013.01); *G02F 1/133603* (2013.01); *G02F 2001/133607* (2013.01)

(58) Field of Classification Search
CPC .. G02B 6/0021; G02B 6/0038; G02B 6/0033; G02B 6/0035; G02B 6/0036; F21V 7/0083; F21V 7/0091; F21V 5/007; G02F 1/33603; G02F 1/133606; G02F 1/133609; G02F 2001/133607; G02F 6/0038
USPC .............. 362/97.1, 97.2, 97.3, 611, 612, 613, 362/617
See application file for complete search history.

(56) References Cited

U.S. PATENT DOCUMENTS

| | | | |
|---|---|---|---|
| 6,598,987 | B1 | 7/2003 | Parikka |
| 6,647,199 | B1 | 11/2003 | Pelka et al. |

(Continued)

FOREIGN PATENT DOCUMENTS

| | | |
|---|---|---|
| DE | 29805006 U1 | 7/1998 |
| JP | 9026761 A | 1/1997 |
| JP | 09320320 A | 12/1997 |
| JP | 10082915 A | 3/1998 |
| JP | 10082916 A | 3/1998 |

(Continued)

*Primary Examiner* — Alan Cariaso
(74) *Attorney, Agent, or Firm* — Meenakshy Chakravorty

(57) ABSTRACT

The invention relates to an illumination module (1) comprising a plurality of light sources (2) distributed over a light guiding plate (3) accommodating said light sources and capable of guiding light of said light sources through at least a portion of said plate. The light guiding plate has one or more out-coupling structures (4), preferably arranged around each light source, so that at least a portion of the light emitted by a first light source (2A) and at least a portion of the light emitted by a second adjacent light source (2B) mix within said light guiding plate before leaving said illumination module as a single substantially collimated mixed light beam. The invention further relates to a lamp and a display apparatus comprising such an illumination module.

15 Claims, 11 Drawing Sheets

(56) References Cited

U.S. PATENT DOCUMENTS

| | | | |
|---|---|---|---|
| 7,324,080 B1 * | 1/2008 | Hu et al. | 345/102 |
| 7,534,013 B1 * | 5/2009 | Simon | 362/335 |
| 7,780,306 B2 * | 8/2010 | Hoshi | 362/97.1 |
| 7,997,771 B2 * | 8/2011 | Epstein et al. | 362/339 |
| 2002/0097354 A1 | 7/2002 | Greiner | |
| 2003/0026106 A1 | 2/2003 | Knaack et al. | |
| 2004/0027467 A1 | 2/2004 | Shiga | |
| 2004/0080938 A1 | 4/2004 | Holman et al. | |
| 2004/0212998 A1 | 10/2004 | Mohacsi | |
| 2004/0218388 A1 | 11/2004 | Suzuki | |
| 2004/0233665 A1 | 11/2004 | West et al. | |
| 2005/0001537 A1 | 1/2005 | West et al. | |

FOREIGN PATENT DOCUMENTS

| | | |
|---|---|---|
| JP | 11510968 A | 9/1999 |
| JP | 2001133779 A | 5/2001 |
| JP | 2002075036 A | 3/2002 |
| JP | 2002133932 A | 10/2002 |
| JP | 2003262866 A | 9/2003 |
| JP | 2004335524 A | 11/2004 |
| JP | 2005203225 A | 7/2005 |
| JP | 2005521197 A | 7/2005 |
| WO | 9826212 A1 | 6/1998 |
| WO | 0196817 A1 | 12/2001 |
| WO | 2004094896 A2 | 11/2004 |

* cited by examiner

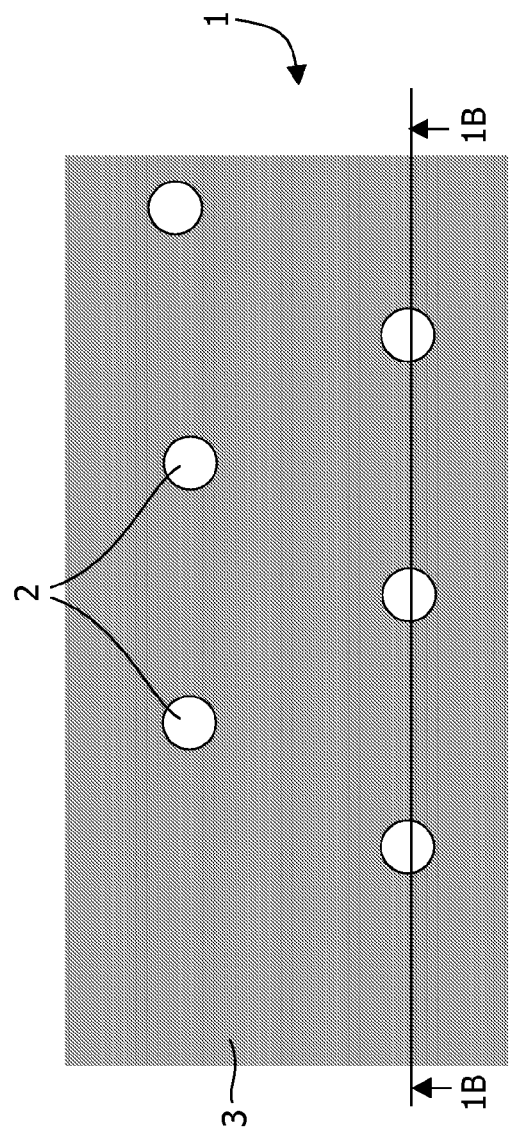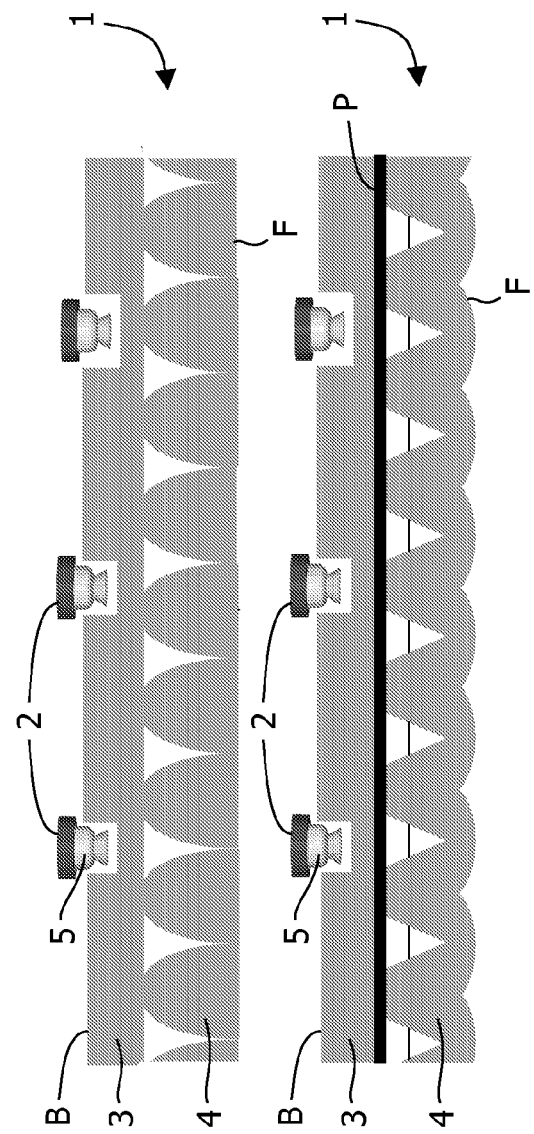
FIG. 1A
FIG. 1B
FIG. 1C

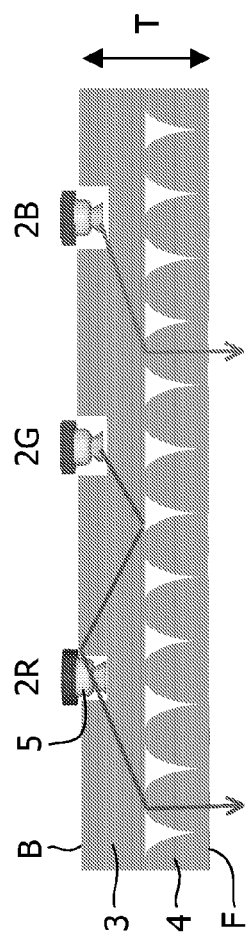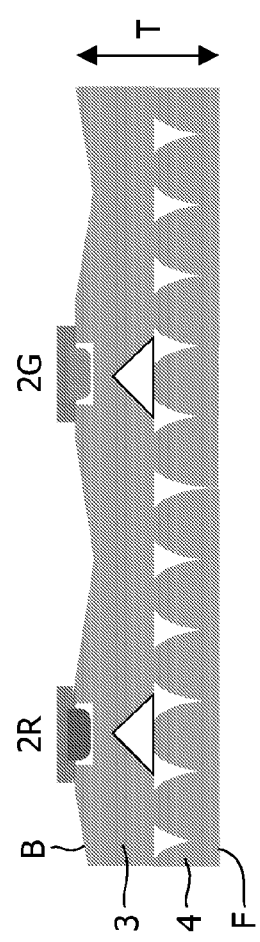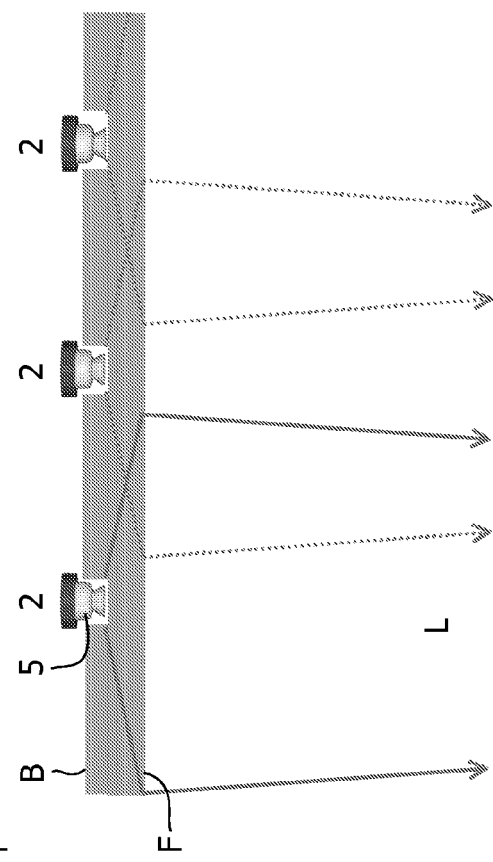

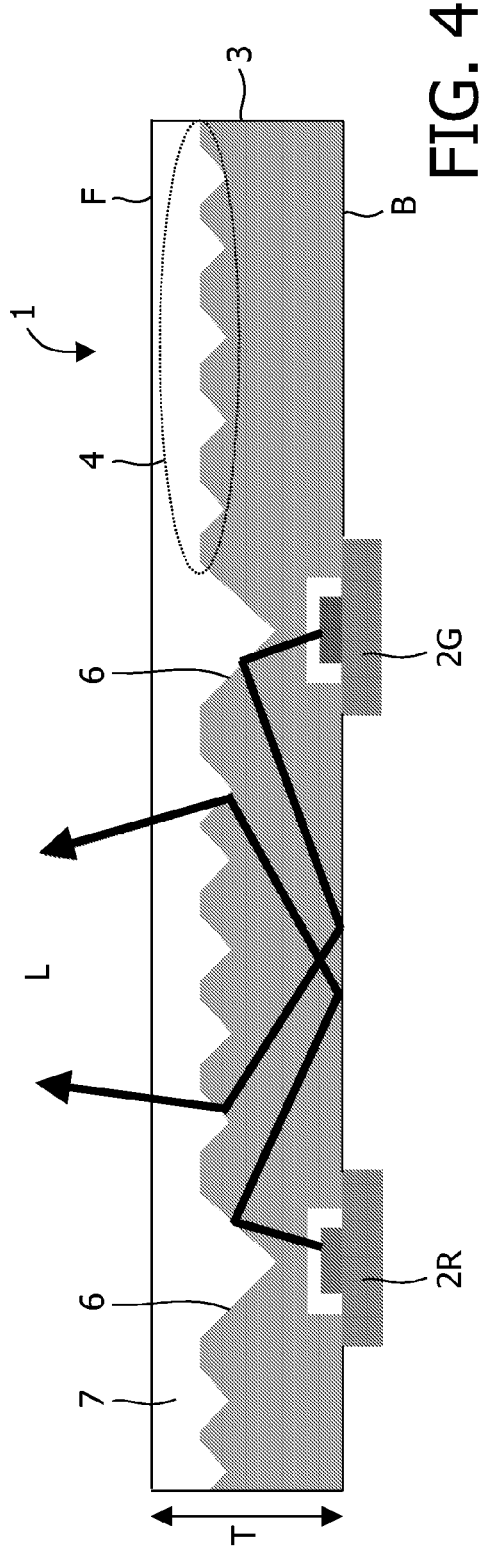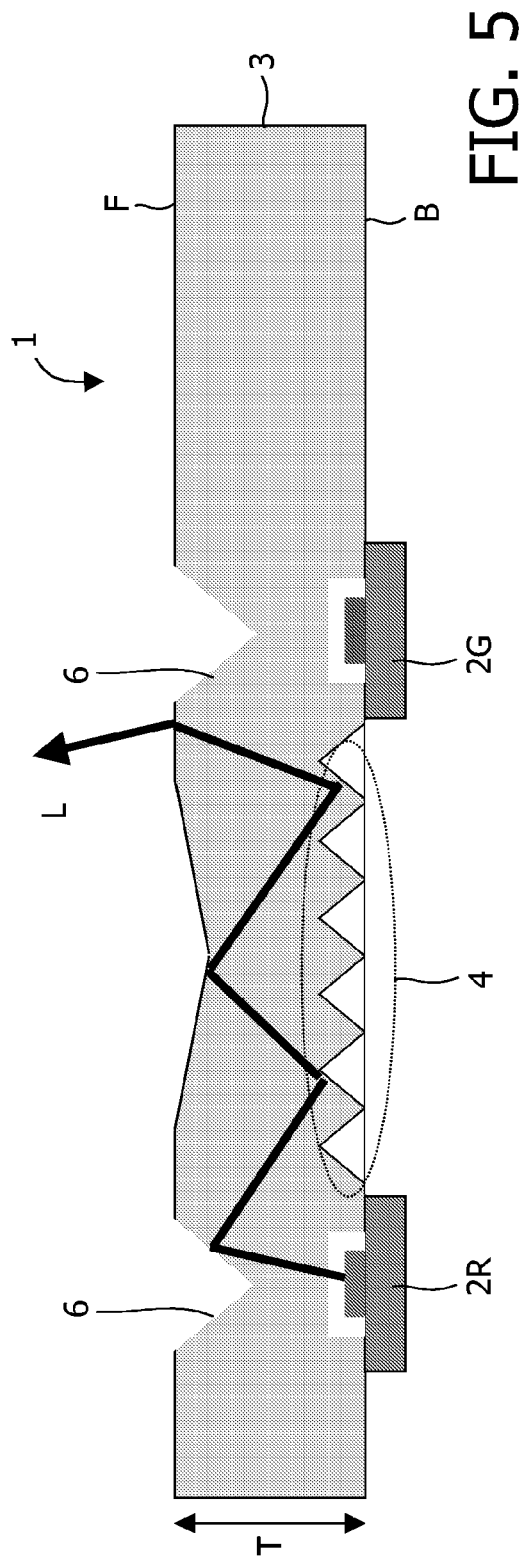

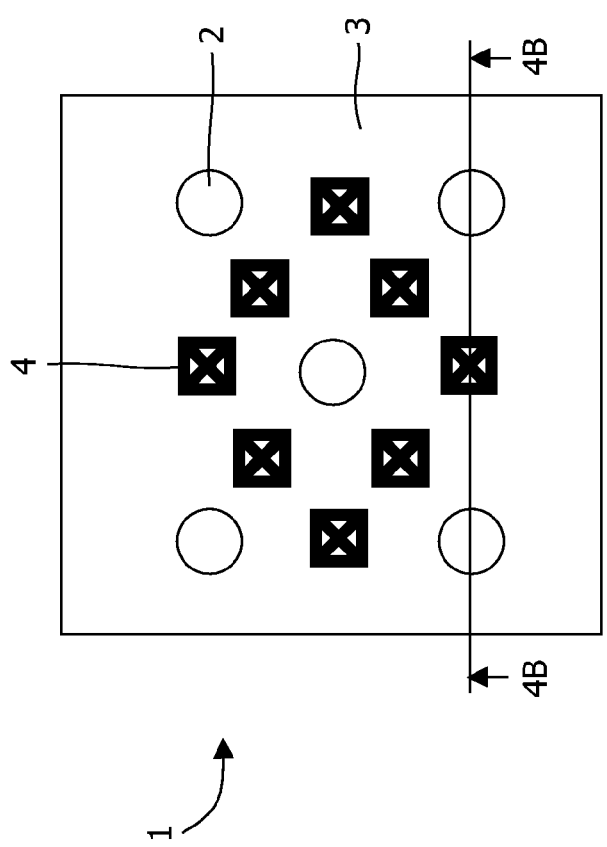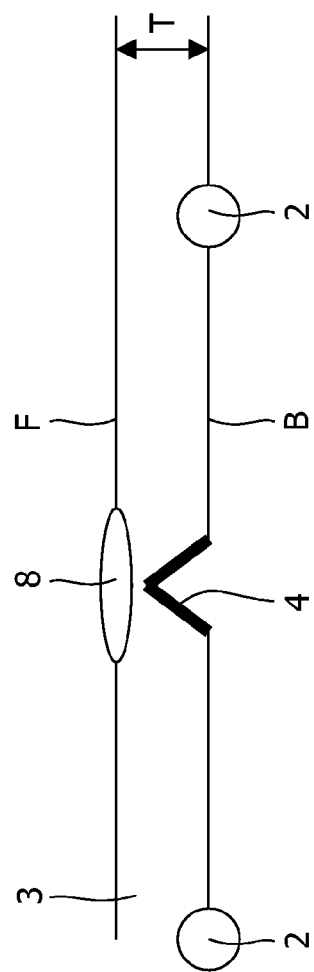
FIG. 6A
FIG. 6B

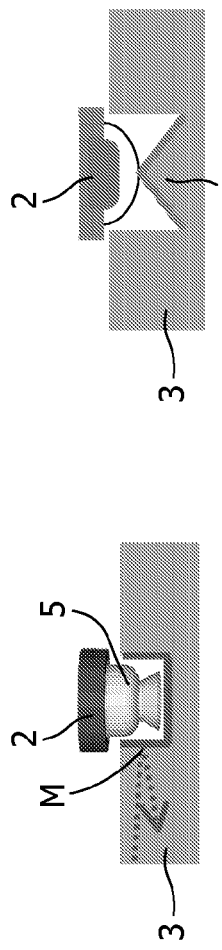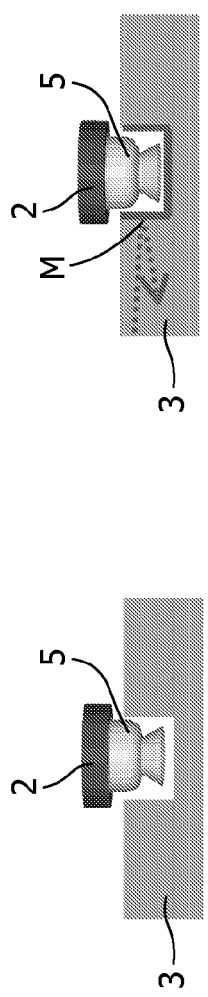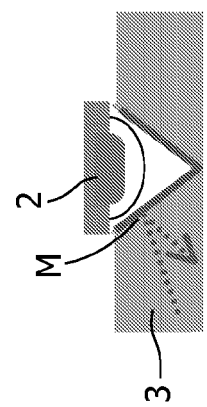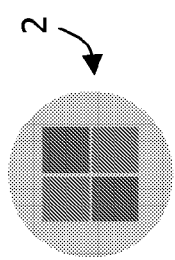

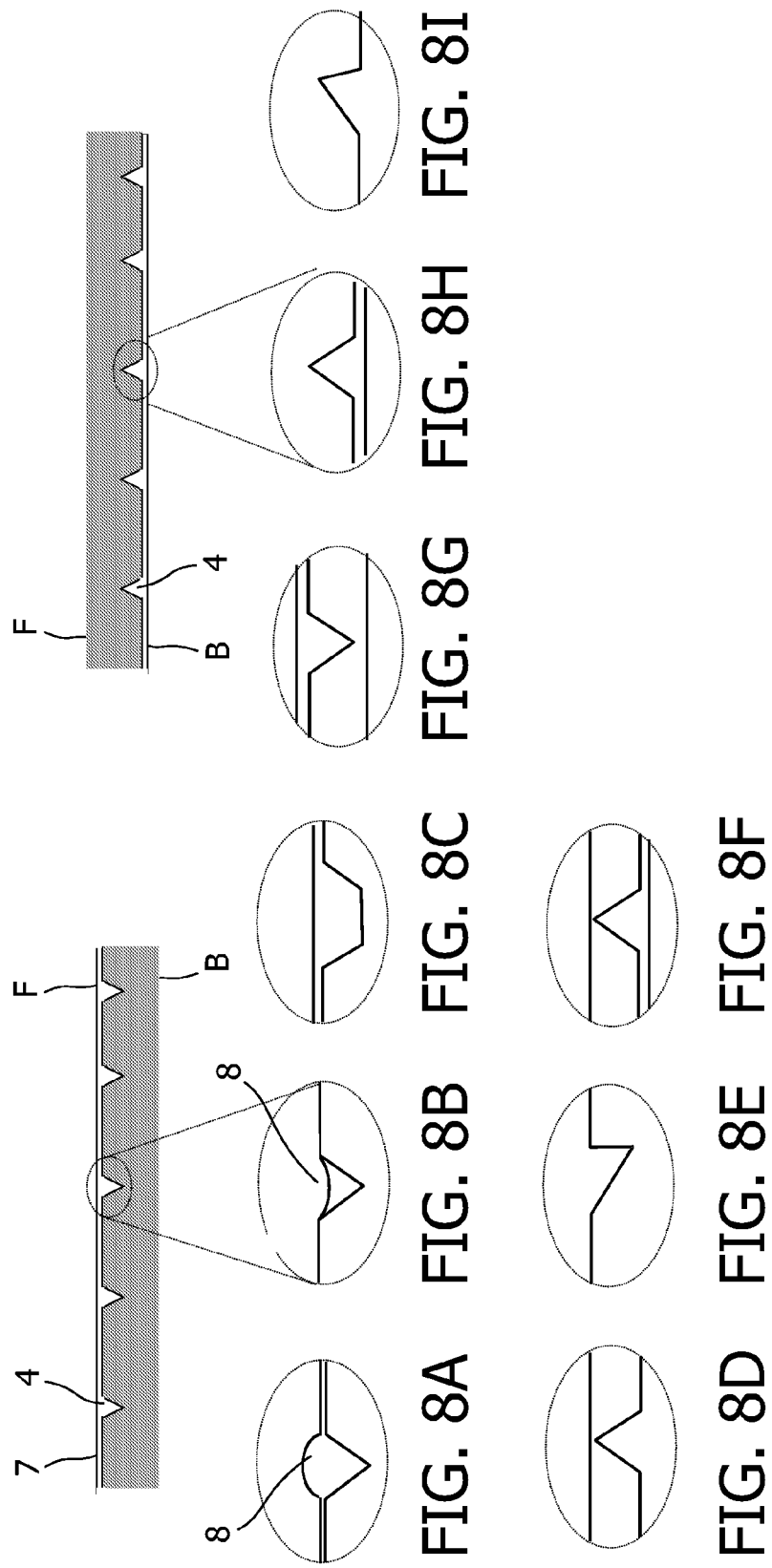

ILLUMINATION MODULE

The invention relates to an illumination module and a lamp or display apparatus comprising such an illumination module.

In recent years, spectacular progress has been made in the brightness, lumen efficacy and affordability of solid state light sources, such as light-emitting diodes (LEDs). This progress has enabled new lighting applications that are no longer restricted to niche markets. An application that comes within reach is the matrix illumination of surfaces. In matrix illumination, a substantially planar illumination module is applied comprising a number of light sources that emit collimated light such that the light sources can still be recognized in the far field. An example is the illumination of a table with a flat and thin illumination module suspended at some distance from the table. Such a module can be used to convey a mood or display non-alpha numerical information on a surface. Matrix illumination can also be used to enhance the viewing experience when watching television by using it as ambient lighting that extends the image outside the boundaries of the television screen.

Illumination modules known thus far are based on backlights as used in liquid crystal displays (LCDs) or are based on a collection of LEDs positioned side-by-side or distributed on some surface. However, backlights as used in LCDs constitute only a single pixel and provide light that is essentially non-directional (i.e. insufficiently collimated to be of use for matrix illumination). A collection of discrete LEDs, when equipped with collimators, can provide collimated light but does not give the appearance of a uniformly emitting surface.

JP 10-082915 discloses a surface light source device, in which the rear surface of a light guiding plate is provided with a recess for the insertion of a light source. The light source, such as an LED, is press-fitted and fixed into the recess. The recess for insertion of the light source is so formed that it is narrower in width on the deeper side at least at the front end of the recess. As a result, the light emitted forward from the light source is incident on the inside of the light guiding plate while the light is refracted laterally by the flanks of the recess for insertion of the light source. Accordingly, the quantity of the light made incident on the inside of the light guiding plate forward of the light source may be decreased.

A problem associated with the prior art illumination module is that this module is not capable of emitting collimated light such that the light sources of the illumination module can still be recognized in the far field while obtaining a uniform light distribution on a surface in the far field. In other words, the prior art illumination module is not suitable for use as a matrix illumination module.

It is an object of the invention to provide an illumination module suitable for use as a matrix illumination module.

To this end, an illumination module is provided comprising a plurality of light sources distributed over a light guiding plate accommodating said light sources and capable of guiding light of said light sources through at least a portion of said plate, in which said light guiding plate comprises one or more out-coupling structures arranged so that at least a portion of the light emitted by a first light source and at least a portion of the light emitted by a second adjacent light source mix within said light guiding plate before leaving said illumination module as a single substantially collimated mixed light beam.

An illumination module suitable for matrix illumination is obtained by positioning the out-coupling structures so that the condition is fulfilled whereby light is allowed to mix within the light guiding plate, while light emitted from the illumination module is substantially collimated. The out-coupling structure is preferably an integrated part of the light guiding plate. Mixture of light is allowed by arrangement of the out-coupling structures so that two or more light sources use or share an out-coupling structure to obtain collimated light from the illumination module. Apart from matrix illumination, the illumination module according to the invention may also be used for other purposes, including a highlighting backlight for liquid crystal displays.

In a preferred embodiment of the invention, each light source is provided substantially within the center of at least one concentric out-coupling structure. The center position of the light source with respect to the out-coupling structure allows mixture of the light beams of adjacent light sources and subsequent collimation of the mixed resulting light beam. Accordingly, an illumination module is obtained capable of providing a uniform light distribution of collimated light beams on a surface while individual collimated light beams can still be recognized. The collimated light beams comprise light of at least the first light source and the second light source.

The embodiment of the invention as defined in claim 3 has the advantage of simple manufacture.

The embodiment of the invention as defined in claim 4 provides the advantage of an effective out-coupling structure that can be manufactured in or on the light guiding plate in a relatively simple manner. Out-coupling can be enhanced or controlled by adding further optical means, such as a lenticular lens within the groove.

The embodiment of the invention as defined in claim 5 has the advantage of an increased predictability of the output direction of the collimated light. Preferably, the out-coupling structure is such that light traveling within the light guiding plate hits the structure in a perpendicular manner. The output direction of light traveling parallel to the out-coupling is less predicable. A discontinuous structure may reduce the contribution of this latter component. A particularly advantageous embodiment of the invention is defined in claim 6.

The embodiment of the invention as defined in claim 7 provides the advantage of an illumination module emitting light of only a particular polarization state, whereas light with the orthogonal polarization state is not emitted from the module. In this manner, a backlight emitting collimated and polarized light is obtained that may e.g. be used in a liquid crystal display monitor.

The embodiment of the invention as defined in claim 8 has the advantage that light emitting diodes (LEDs) have a small form factor, enabling a thin planar illumination module. Additionally, LEDs have a long service lifetime, low operating voltages, almost pure spectral colors, fast modulation of the lumen output and fast switching between an on and off state.

The embodiment of the invention as defined in claim 9 has the advantage of obtaining a uniform light distribution for each color on the surface in the far field.

The embodiment of the invention as defined in claim 10 has the advantage of avoiding the need of an additional layer at the vulnerable surface of the illumination module where the collimated light beams leave this module.

The embodiment of the invention as defined in claim 11 offers the advantage of enhanced control of the location where the light leaves the illumination module. In particular, the possibility that most of the light leaves the module in the proximity of the light source may be avoided.

The embodiment of the invention as defined in claim 12 has the advantage that non-side light emitting LEDs can be used to couple light of the LEDs into the light guiding plate.

The embodiment of the invention as defined in claim 13 provides the advantage of control of the light output of collimated light beams from the illumination module. In particular, patterns or (moving) images can be projected on a surface in accordance with control signals input on the illumination module. Alternatively, the illumination module with controllable LEDs can be used to highlight or improve dynamically the contrast in dark areas of the image to be displayed.

It is noted that the above described embodiments, or aspects thereof, may be combined.

The invention further relates to a lamp capable of illuminating a surface comprising an illumination module as described above, in which said light sources are arranged in a matrix and said out-coupling structures are arranged to have overlapping single collimated mixed light beams on said surface. This surface may e.g. be a table or wall or an LCD display panel in which case the lamp may be used for highlight backlighting.

The invention also relates to a display apparatus comprising a liquid crystal display panel capable of displaying images by receiving a video signal and a backlight comprising an illumination module as described above with individually addressable light sources, in which said backlight is capable of highlighting regions of said liquid crystal display panel by controlling said individually addressable light sources in accordance with said video signal.

The invention also relates to a display apparatus capable of displaying images on a display panel by receiving a video signal, said display apparatus comprising an illumination module as described above with individually addressable light sources, in which said illumination module is arranged for suggesting extension of said image outside said display panel by controlling said individually addressable light sources in accordance with said video signal.

The lamp and display apparatus are particularly advantageous applications of the illumination module according to the invention.

The invention will be further illustrated with reference to the attached drawings, which schematically show preferred embodiments according to the invention. It will be understood that the invention is in no way restricted to these specific and preferred embodiments.

In the drawings:

FIGS. 1A-1C schematically show a portion of an illumination module in top view and in cross-section according to a first and second embodiment of the invention;

FIGS. 2A-2C schematically show a portion of an illumination module in cross-section according to a further embodiments of the invention including an indication of light rays from the module;

FIGS. 3A and 3B schematically show a portion of an illumination module in top view and in cross-section according to a preferred embodiment of the invention;

FIGS. 4 and 5 schematically show examples of illumination modules according to further preferred embodiments of the invention;

FIGS. 6A and 6B show a still further embodiment of an illumination module according to the invention in top view respectively cross-section.

FIGS. 7A-7I show various embodiments for in-coupling structures;

FIGS. 8A-8I show various examples of out-coupling structures for an illumination module according to an embodiment of the invention;

FIGS. 1-6 schematically illustrate a portion of an illumination module 1 (not to scale) in top view and in cross-section according to different embodiments of the invention.

The illumination module 1 comprises a plurality of light sources 2, such as light-emitting diodes (LEDs). The LEDs 2 are distributed over a light guiding plate 3, accommodating the LEDs 2, which is capable of guiding light from the light sources 2 through at least a portion of the plate 3. The light guiding plate 3 has integrated out-coupling structures 4 arranged and shaped such that at least a portion of the light emitted by first LED 2A and at least a portion of the light emitted by second adjacent LED 2B mix within the light guiding plate 3 before leaving the illumination module 1 as a single substantially collimated mixed light beam L at the front side F of the module 1.

Figures 3A, 3B:
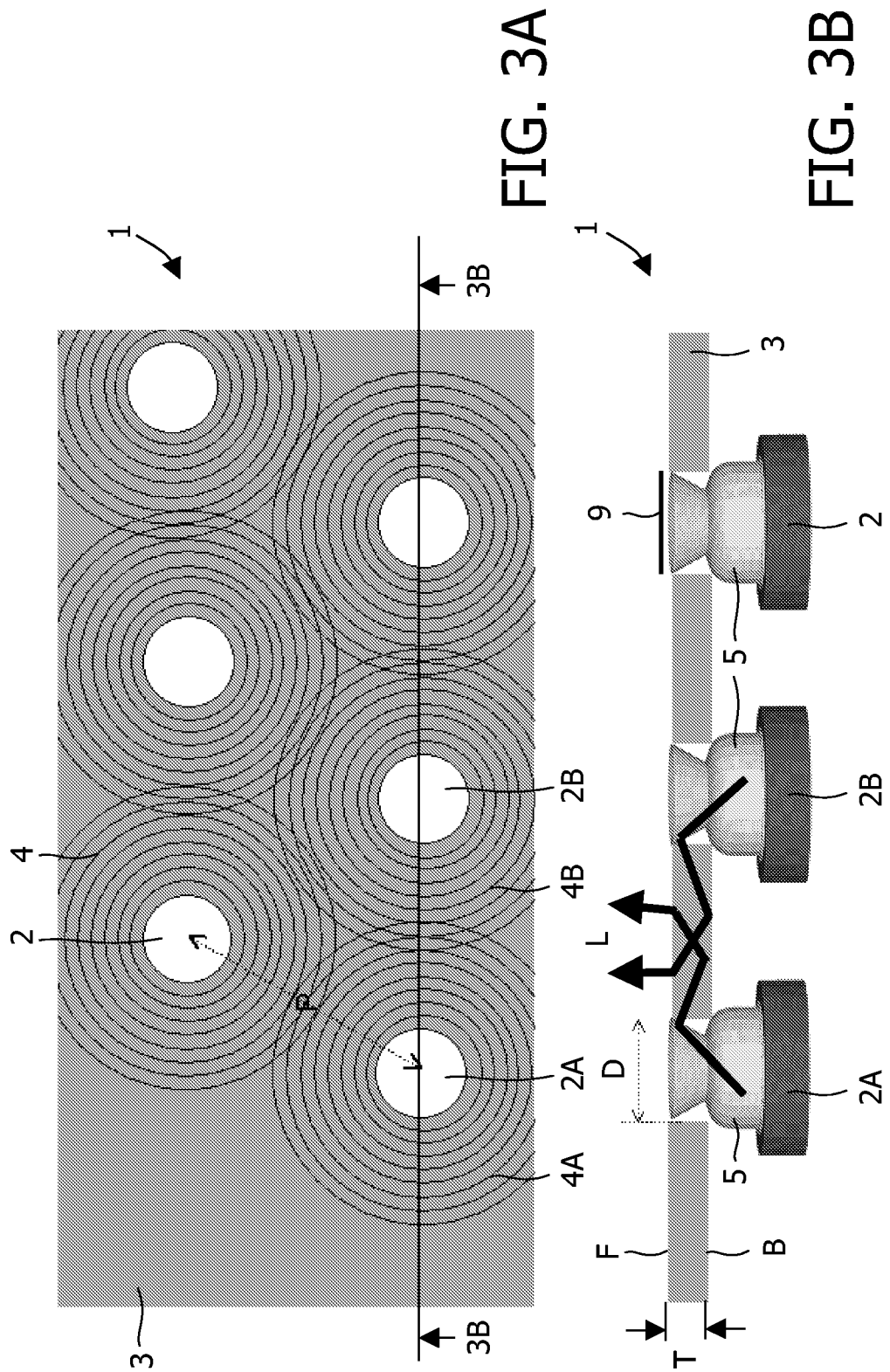

As shown in FIGS. 2C, 3B and 4, the illumination module 1 is such that light L leaving the module 1 is collimated to a high degree in order to be useful for matrix illumination. It is noted that the out-coupling structure 4 is not shown in FIG. 2C. The light L leaving the illumination module 1 is such that it is uniformly distributed on the surface to be illuminated. Substantially no light is lost within the light guiding plate 3, which provides a high efficiency illumination module 1. The out-coupling structures 4 are such that light generated by the LEDs 2 travels far enough within the light guiding plate 3 to mix with light of an adjacent LED 2, whereas on the other hand the light path is limited so that resolvable pixels can be identified on the object to be illuminated. The LEDs 2 may be preferably be individually addressable, i.e. the light emitting state of the LEDs 2 may be individually controlled.

The LEDs 2 in FIGS. 1A-1C, 2A, 2C and 3A and 3B are side light emitting diodes having an optical means 5 coupling light into the light guiding plate 3. The LEDs 2 may be capable of emitting light of different colors, as shown in FIG. 2A, e.g. a red LED 2R, a green LED 2G and a blue LED 2B.

The light guiding plate 3 may either be a single unitary plate or comprises one or more layers. The light guiding plate 3 is a thin plate, in which the minimal thickness is determined by optical considerations. The upper thickness is dependent on considerations of the weight of the illumination module 1 and the costs of manufacture. As an example, the thickness T of the light guiding plate is in the range 1-20 mm, preferably in the range 2-10 mm, such as 4.5 mm. The light guiding plate 3 may e.g. be made of a plastic, such as polycarbonate or Perspex.

In FIGS. 2B and 5, the thickness T of the light guiding plate 3 varies in the direction between the LEDs 2 in order to prevent most light from leaving the plate in proximity to the LEDs 2. The thickness variation of the plate 3 may also be applied for the other embodiments.

The out-coupling structure 4 may comprise a polarization selective layer P, shown in FIG. 1C. This polarization selective layer P may preferably be a bi-refringent layer. Light is only emitted from the illumination module 1 if it has the correct polarization state whereas light with an orthogonal polarization state is not coupled out of the light guiding plate 3. Light that is not coupled out directly, will gradually change its polarization state during further reflections inside the light guiding plate 3 until it has the correct polarization state to pass the layer P. Consequently, an illumination module 1 is obtained capable of emitting polarized light.

In FIGS. 1A-1C and 2A-2C, the position of the out-coupling structure 4 with respect to the LEDs 2 are uncorrelated, i.e. the out-coupling structure 4 as 'seen' from a first LED is not necessarily similar to that of an adjacent LED. This is clearly illustrated in e.g. FIG. 1B. In contrast, each of the LEDs 2 of the embodiments of FIG. 3A-5 are provided in the center of a continuous out-coupling structure 4, as is most clearly illustrated in FIG. 3A. In these embodiments, the position of the out-coupling structure 4 is related to the position of the LEDs 2.

Although the out-coupling structures 4 in FIG. 3A overlap in part, the out-coupling structures may as well be arranged such that no overlap is present. In that case, light mixing within the light guiding plate 3 is obtained by the fact that a portion of the light emitted by a LED 2A passes the out-coupling structure 4A associated with that LED 2 towards an out-coupling structure 4B of an adjacent LED 2B.

The pitch P of LEDs 2 in FIGS. 3A and 3B is 80 mm, whereas the diameter D of the LED 2 is 6 mm. It should be appreciated that the pitch P and diameter D may vary, e.g. for the pitch P in a range between 1-500 mm, more preferably between 5-150 mm. The pitch P is e.g. dependent on the size of the LEDs and the application. A small pitch P may be used to obtain sufficient light per unit area for LEDs with a small light-emitting surface. The pitch P may e.g. be chosen in the range 50-100 mm to illuminate a surface, , whereas a pitch P of 10-30 mm may be more suitable for an illumination module 1 employed in a highlighting backlight.

FIG. 4 schematically shows a portion of an illumination module 1 in cross-section according to an embodiment of the invention. Normal color LEDs 2 are employed instead of side light-emitting diodes 2. Light of the LEDs 2 is coupled into the light guiding plate 3 by an in-coupling structure 6, e.g. a groove suitably arranged with respect to the LED 2. A small indentation (not shown) at the location of the LED 2 at the back B of the light guiding plate may improve in-coupling of light from the diode 2. Further in-coupling structures 6 are discussed with reference to FIGS. 7A-7I.

The out-coupling structure 4 is formed by a series of grooves provided around each LED 2. The in-coupling grooves 6 and out-coupling grooves 4 may be made in a simple manner, e.g. by embossing. An additional layer 7 of a refractive index higher than that of the layer with the grooves 4, 6 is provided at the light output side to obtain a substantially collimated light beam L. Consequently, the surfaces of the grooves 6 are provided with a mirror to obtain efficient in-coupling of light in the light guiding plate 3. The larger the difference between the refractive indices, the easier light is extracted from the light guiding plate 3 at the position of the grooves 4.

FIG. 5 schematically shows a portion of an illumination module 1 in cross-section according to an embodiment of the invention. In this embodiment, the out-coupling structure 4 comprises a series of grooves provided at the back B of the light guiding plate 3, i.e. at the same side as the LEDs 2. This embodiment is advantageous over the embodiment of FIG. 2 in that no additional layer 7 is applied at the vulnerable front side F of the illumination module 1 and in that the grooves 6 do not need a mirror surface for in-coupling of light in the light guiding plate 3. Further, the thickness T of the light guiding plate 3 varies in the direction between the LEDs 2 in order to prevent most light from leaving the plate in proximity to the LEDs 2. The thickness variation of the plate 3 may also be applied for the embodiment shown in FIG. 4. Variation of the thickness T of the light guiding plate 3 may be employed either at the front side F or the back B as well as on both sides.

FIGS. 6A and 6B schematically show a portion of an illumination module 1 in top view and in cross-section according to an embodiment of the invention. In contrast with the embodiments of FIGS. 3A-5, the out-coupling structures 4 in the present embodiment are non-continuous structures provided between adjacent LEDs 2 of the illumination module 1. The structures 4 may e.g. have a pyramidal shape. Light is mixed in the light guiding plate 3 since light in this plate 3 travels within this plate until it is coupled out by a pyramidal structure 4. By selecting a proper arrangement of the pyramidal structures 4, a portion of the light within the plate 3 travels further than halfway of the distance between adjacent LEDs 2. Optical means 8, such as a lenticular lens, are provided in alignment with the pyramidal structures 4. Every pyramidal structure 4 can be considered as a point source of light and a high quality parallel beam of light is obtained by locating this structure 4 in the focal point of the lens 8.

It should be appreciated that in the embodiments of the invention disclosed in FIGS. 1A-6B, additional means may be used for improving or optimizing the performance of the illumination module 1. As an example, additional means may be provided to avoid or reduce the chance of no input of light into the light guiding plate 3. In the embodiment of FIG. 3B, a cover 9 may e.g. be provided on top of the side emitting LED 2, which cover is capable of absorbing or partially reflecting light received by this cover 9.

It should further be appreciated that in-coupling of light from the LEDs 2 into the light guiding plate 3 may be accomplished in a variety of ways, some of which are schematically illustrated in FIGS. 7A-7I. FIG. 7A illustrates use of a side light emitting LED 2 inserted in a hole of the light guiding plate 3. FIG. 7B illustrates the example of FIG. 7A in combination with a dichroic mirror M to prevent out-coupling of light of another LED 2 via the in-coupling structure of the LED 2 under consideration. The embodiments shown in FIGS. 7C and 7D illustrate a forward light emitting LED 2 that couples emitted light into the light guiding plate 3 via a reflective cone C. FIGS. 7E-7G illustrate a forward light emitting LED 2 coupling emitted light into the light guiding plate 3 by refraction from an inverted cone C in combination with a lens and/or a dichroic mirror M. The embodiment of FIG. 7H shows a forward light emitting LED 2 that couples emitted light into the light guiding plate 3 by diffraction from a grating G or a holographic structure. Finally, in FIG. 7I an embodiment is shown of an LED 2 emitting red, green and blue light. Such an LED 2 may replace any of the monochrome LEDs 2 of FIGS. 7A-7H.

It should also be appreciated that for the out-coupling structure 4 other structures may be envisaged than V-shaped grooves. FIGS. 8A-8I show some groove variations, including asymmetric grooves, with or without an optical lens 8 both for the front side F and the back B of the light guiding plate 3. The grooves may e.g. be manufactured by hot embossing of the light guiding plate 3. LEDs 2 have been omitted in FIGS. 8A-8I for reasons of clarity. As shown in FIGS. 8F and 8G, an additional layer or layers may also be employed for out-coupling structures 4 provided at the back B.

Figure 9A:
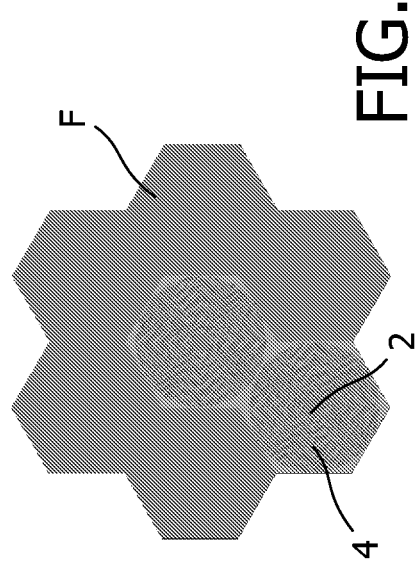
FIGS. 9A-9C show a simulation model of an illumination module according to an embodiment of the invention.
Figure 9B:
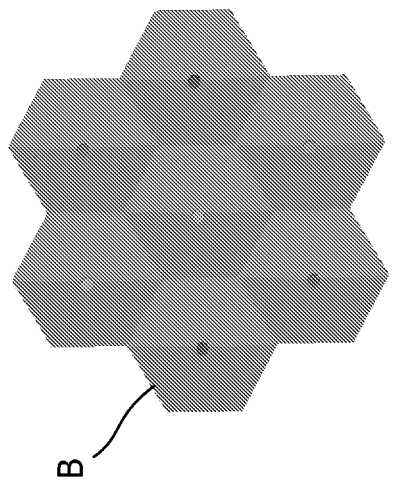
Figure 9C:
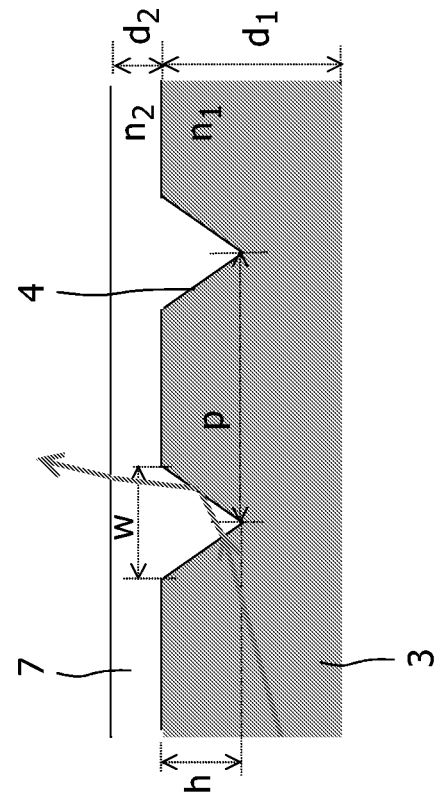

Ray tracing simulations for the behavior of the illumination module 1 according to the invention have been performed on the model shown in FIGS. 9A-9C approximating the embodiment depicted in FIGS. 3A and 3B. FIGS. 9A and 9B respectively show a top view and bottom view with a few unit cells, whereas FIG. 9C displays a structure defining the simulation parameters. A mirror is simulated to be located on the back B of the light guiding plate 3.

The pitch P of the LEDs is taken to be 80 mm and the LED diameter is 6 mm. The light guiding plate 3 is provided with triangular grooves filled with a transparent material that has a refractive index exceeding the refractive index of the light guiding plate 3. The light guiding plate 3, e.g. PMMA, is taken to have a refractive index n1=1.49, whereas the transparent material is taken to have a refractive index n2=1.75. The other dimension of FIG. 9C are: d1=3 mm; d2=0.01 mm, whereas the pitch p of the grooves 4 is 0.4 mm. The width w and height h of the grooves 4 are taken as w=0.2 mm and h=0.15 mm respectively.

Figure 10B:
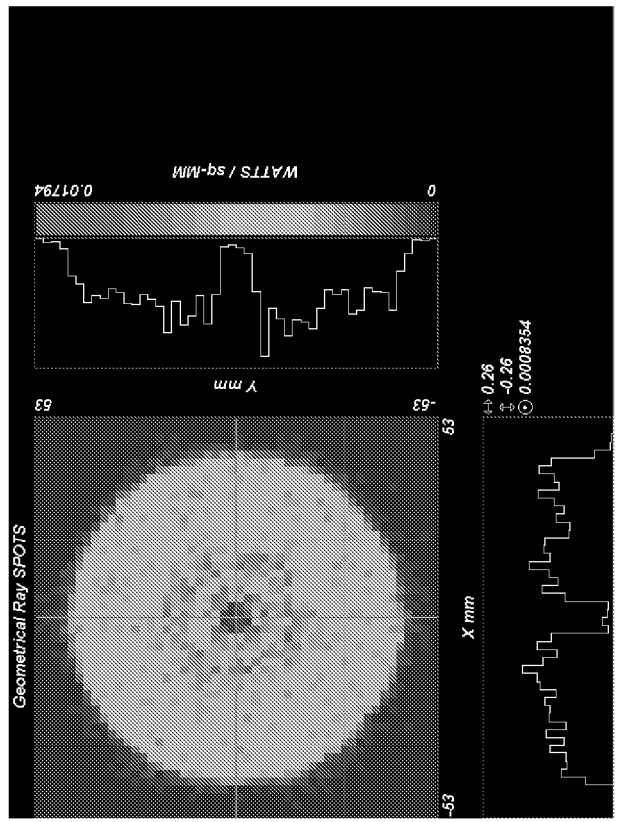
FIGS. 10A and 10B show results of a simulation performed on the model illustrated in FIGS. 9A-9C.
Figure 10A:
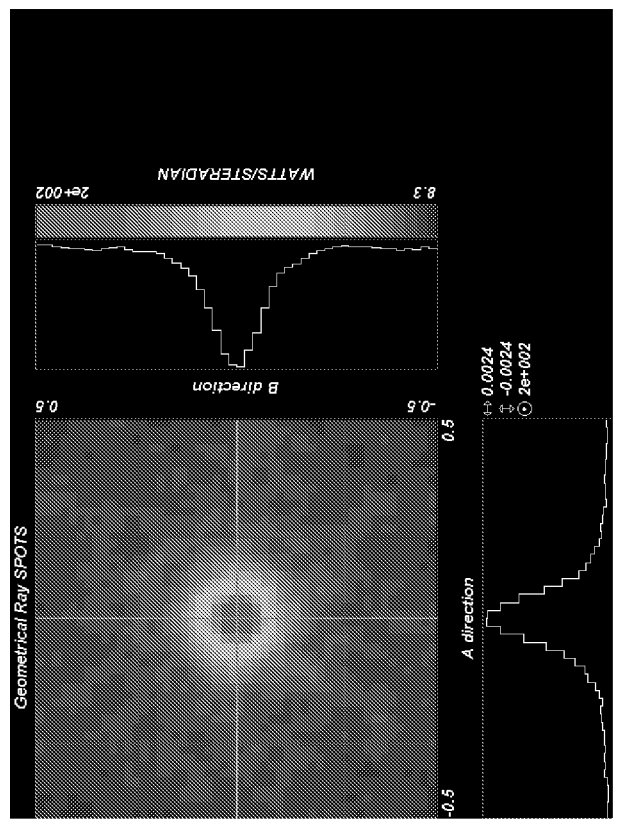

FIGS. 10A and 10B respectively show the angular distribution and spatial distribution simulation results of light L leaving the light guiding plate 3 if there is only a single light emitting LED 2.

The angular distribution of the light output of FIG. 10A is peaked in the forward direction, indicating a high degree of collimation. Much of the emitted light is directed within a cone of 20 degrees. The angular light distribution cone may be further reduced by e.g. increasing the difference between refractive indices n1 and n2.

The spatial distribution shown in FIG. 10B is substantially uniform apart from a central hole. The cover 9 or the modifications of the illumination module 1 shown in FIGS. 4 and 5 may improve this situation.

Figure 11A:
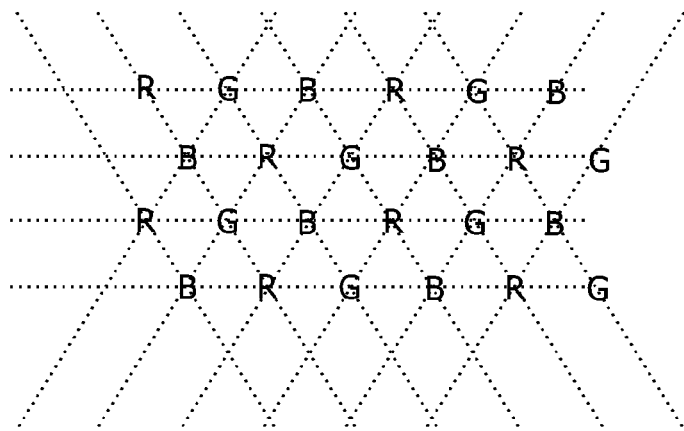
FIGS. 11A-11C show various distributions of light sources for an illumination module according to an embodiment of the invention.
Figure 11B:
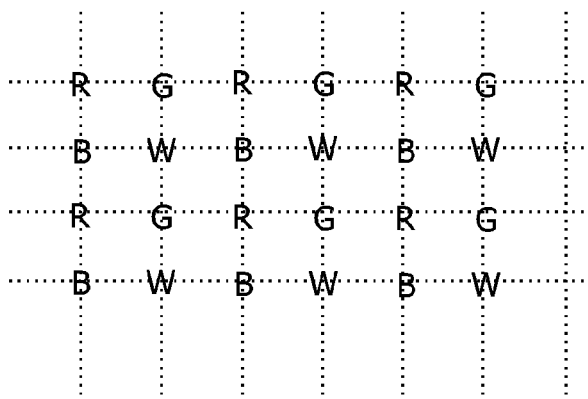
Figure 11C:
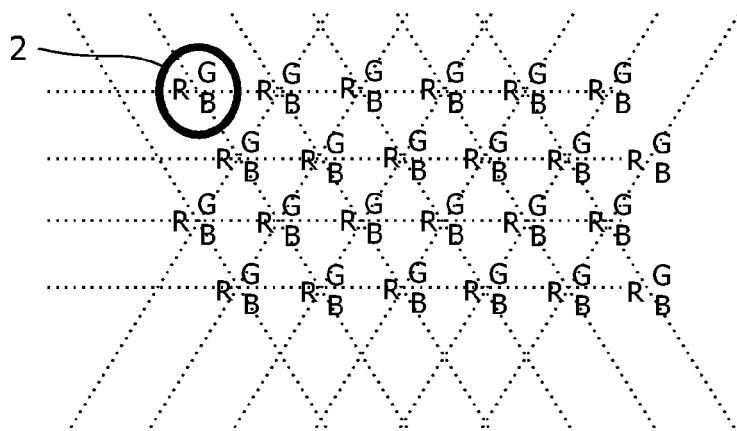

As shown in FIGS. 11A-11C, various alternatives are available for the distribution of LEDs 2 over the module 1. FIG. 11A shows the well-known delta-nabla distribution. The LEDs 2 emit red (R), green (G) or blue (B) light and each have an associated out-coupling structure 4 (not shown). FIG. 11B shows an alternative distribution including white (W) light emitting LEDs in combination with R, G and B LEDs 2. Instead of distributing the LEDs 2 individually over the light guiding plate 3, it can also be advantageous to arrange the LEDs 2 in multiples of colored LEDs 2, each multiple forming a light source 2 having an associated out-coupling structure 4, schematically illustrated in FIG. 11C. E.g. triplets of R, G, and B, shown in FIG. 1 IC, or quadruplets of R, G, B, and W or combinations of both may be used. The advantage will be that shadows will no longer have colored edges.

It should be appreciated that other distributions may be possible and fall within the scope of the present invention.

Figure 12B:
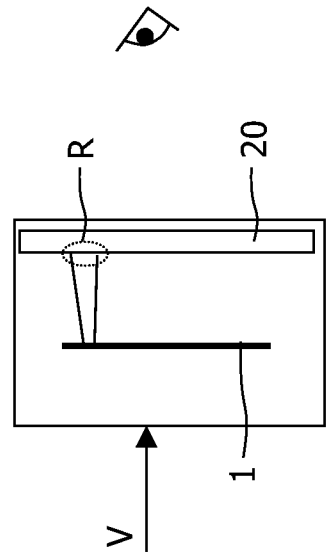
FIGS. 12A-12C show a lamp for illuminating a table and an LCD panel and a display apparatus comprising an illumination module according to an embodiment of the invention.
Figure 12A:
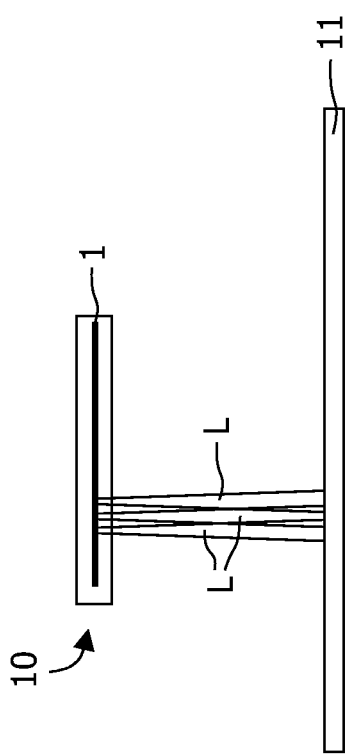
Figure 12C:
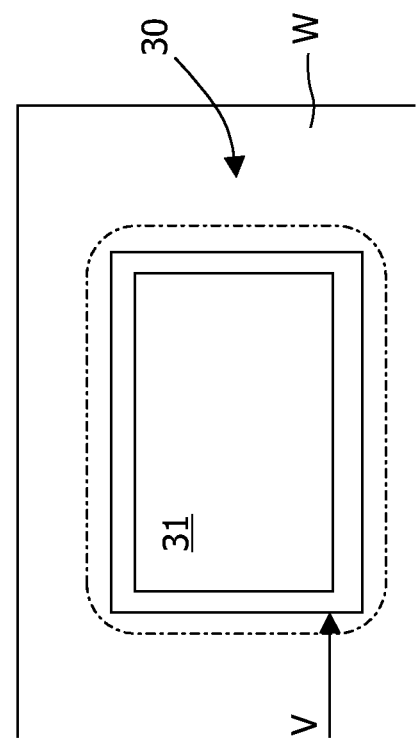

The illumination module 1 may be used for various applications, a few of which are schematically depicted in FIGS. 12A-12C.

In FIG. 12A, the illumination module 1 is a lamp 10 for illuminating a surface 11, such as a table or a wall. The LEDs 2 are arranged in a matrix, e.g. as shown by the distributions of FIGS. 11A-11C. The out-coupling structures 4 are arranged to have overlapping single collimated mixed light beams L on the surface 11.

In an alternative application, shown in FIG. 12B, the illumination module 1 with individually addressable LEDs 2 is used as a highlighting collimated backlight for an LCD display panel 20. Depending on the image shown on the display panel, the pixelated backlight illumination module 1 may locally, e.g. in a region R, generate more or less light in a controlled fashion. Accordingly, the brightness in the region R may be reduced or increased or the power consumption can be reduced while simultaneously increasing the contrast. Consider the example in which each pixel on the display panel 20 has 8 bits of gray levels (brightness 0-255). If in region R the instantaneous maximum required brightness is e.g. 127, the illuminating LED 2 may be dimmed and subsequently, the brightness of the pixels in R could be doubled. Consequently, a local 50% power reduction is obtained and contrast may be improved since all available gray levels may be used for region R. The same applies to other regions R on the display panel 2. This method may be applied for each color individually. The illumination module 1 of FIG. 1C may be used as a backlight emitting collimated and polarized light.

FIG. 12C shows a display apparatus 30 capable of displaying images on a display panel 31 by receiving a video signal V. The display apparatus 30 comprises an illumination module 1 as described above with individually addressable LEDs 2. The illumination module 1 is arranged to suggest extension of the image outside the display panel 31 on e.g. a wall W, indicated by the dash-dotted areas, by controlling the individually addressable LEDs 2 in accordance with the video signal V.

It should be appreciated that the above examples only illustrate embodiments of the invention and do not limit the scope of the present invention. Alternatives and additional means have been envisaged, including the implementation of additional, possibly adaptive, optical means for each LED 2. As an example, a lens with a fixed or variable focal distance may be positioned in front of each LED 2 and its surrounding out-coupling structure 4. Further, the illumination module 1 may be augmented with conventional lamps located beneath the light guiding plate 3 and capable of shining through the light guiding plate 3. Still further, the out-coupling structure 4 may be such that light L output from the illumination module 1 leaves the module as an oblique collimated light beam. Such an embodiment would e.g. be advantageous for the display apparatus 30 of FIG. 12C. The angle at which the light output L leaves the illumination module 1 may be different for different parts of the light guiding plate 3. The out-coupling structure 4 may also be a diffractive structure, e.g. a holographic structure. Such a hologram may e.g. be a replicated hologram or a volume hologram.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:
1. An illumination module comprising
   a plurality of light sources distributed over a back side of a light guiding plate accommodating said light sources and capable of guiding light of said light sources through at least a portion of said plate,
   wherein said light guiding plate comprises one or more out-coupling structures disposed on a front side of the light guiding plate and between said light sources such that at least a portion of the light emitted by a first light source and at least a portion of the light emitted by a second adjacent light source mix within said light guiding plate before leaving said illumination module as a single substantially collimated mixed light beam, and
   wherein said light guiding plate further comprises an in-coupling structure disposed on the front side of the light guiding plate for coupling light of said light source into said light guiding plate.
2. The illumination module according to claim 1, wherein each light source is provided substantially within a center of at least one concentric out-coupling structure.

3. The illumination module according to claim 1, wherein each light source is surrounded by at least one continuous out-coupling structure.

4. The illumination module according to claim 1, wherein said out-coupling structure comprises one or more grooves provided in said light guiding plate, which grooves accommodate additional optical means.

5. The illumination module according to claim 1, wherein said out-coupling structure comprises discontinuous out-coupling structures surrounding said light sources.

6. The illumination module according to claim 1, wherein said out-coupling structure comprises pyramidal structures, provided with a lens.

7. The illumination module according to claim 1, wherein said illumination module includes a polarization selective layer, preferably a bi-refringent layer.

8. The illumination module according to claim 1, wherein said light sources comprise one or more light emitting diodes.

9. The illumination module according to claim 1, wherein said light sources comprise light emitting diodes of at least two different colors or multiplets of light emitting diodes of different colors.

10. The illumination module according to claim 1, wherein said light guiding plate comprises holes for accommodating said light sources opposite to the side where said collimated mixed light beams leave said illumination module and said out-coupling structures are provided in said light guiding plate at the same side as said light sources.

11. The illumination module according to claim 1, wherein the thickness of said light guiding plate varies in the direction between said light sources.

12. The illumination module according to claim 1, wherein said module is arranged for individually addressing said light sources.

13. A lamp capable of illuminating a surface comprising an illumination module according to claim 1, wherein said light sources are arranged in a matrix and said out-coupling structures are arranged to have overlapping single collimated mixed light beams on said surface.

14. A display apparatus comprising a liquid crystal display panel capable of displaying images by receiving a video signal and a backlight comprising an illumination module according to claim 1 with individually addressable light sources, wherein said backlight is capable of highlighting regions of said liquid crystal display panel by controlling said individually addressable light sources in accordance with said video signal.

15. A display apparatus capable of displaying images on a display panel by receiving a video signal, said display apparatus comprising an illumination module according to claim 1 with individually addressable light sources, wherein said illumination module is arranged to suggest extension of said image outside said display panel by controlling said individually addressable light sources in accordance with said video signal.

* * * * *